United States Patent
Yi et al.

(10) Patent No.: US 7,196,864 B1
(45) Date of Patent: Mar. 27, 2007

(54) DISK DRIVE HAVING A SERVO CONTROL SYSTEM OPTIMIZED FOR FASTER DETERMINATION OF REPEATABLE RUNOUT CORRECTION VALUES AND RELATED METHOD

(75) Inventors: Li Yi, Berkeley, CA (US); Hemant Melkote, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 11/153,153

(22) Filed: Jun. 15, 2005

(51) Int. Cl.
*G11B 5/596* (2006.01)
*G11B 5/58* (2006.01)

(52) U.S. Cl. .................. 360/77.04; 360/77.01
(58) Field of Classification Search ........... None
See application file for complete search history.

(56) References Cited

U.S. PATENT DOCUMENTS

| | | | |
|---|---|---|---|
| 4,616,276 A | 10/1986 | Workman | |
| 4,890,172 A | 12/1989 | Watt et al. | |
| 5,550,685 A | 8/1996 | Drouin | |
| 5,793,554 A | 8/1998 | Chainer et al. | |
| 5,825,596 A | 10/1998 | Hikosaka et al. | |
| 5,946,158 A | 8/1999 | Nazarian et al. | |
| 5,995,317 A | 11/1999 | Ottesen | |
| 6,141,175 A | 10/2000 | Nazarian et al. | |
| 6,166,875 A | 12/2000 | Ueno et al. | |
| 6,349,464 B1 | 2/2002 | Codilian et al. | |
| 6,437,936 B1 * | 8/2002 | Chen et al. | 360/77.04 |
| 6,522,495 B1 | 2/2003 | Lamberts et al. | |
| 6,549,362 B1 | 4/2003 | Melrose et al. | |
| 6,831,803 B2 | 12/2004 | Hsin | |
| 6,847,503 B2 * | 1/2005 | Zhang et al. | 360/77.04 |
| 6,975,480 B1 | 12/2005 | Codilian et al. | |
| 6,999,267 B1 * | 2/2006 | Melkote et al. | 360/77.04 |
| 2006/0056100 A1 * | 3/2006 | Takaishi | 360/77.04 |

OTHER PUBLICATIONS

Cormen, Thomas H., et al., "Introduction to Algorithms", MIT Press, Cambridge Massachusetts, pp. 783-800, 1990.

* cited by examiner

*Primary Examiner*—Andrea Wellington
*Assistant Examiner*—Jason Olson
(74) *Attorney, Agent, or Firm*—Jonathan E. Prejean, Esq.; Robroy R. Fawcett, Esq.

(57) ABSTRACT

A disk drive is disclosed having a servo control system optimized for faster determination of repeatable runout (RRO) correction values. Each circumferential track on a magnetic disk exhibits total runout having an RRO component and a nonrepeatable runout (NRO) component. The control system generates a control signal for positioning a transducer head during a track following operation based on distributed position information defining the followed track. PES values are calculated based on the distributed servo position information read during a track following operation. The first servo-loop compensator processes the PES values during normal data access operations and has a first transfer function that is optimized with respect to a variance of the total runout. The second servo-loop compensator processes the PES values during a RRO calibration operation and has a second transfer function that is optimized with respect to a variance of the NRO component.

3 Claims, 4 Drawing Sheets

DISK DRIVE HAVING A SERVO CONTROL SYSTEM OPTIMIZED FOR FASTER DETERMINATION OF REPEATABLE RUNOUT CORRECTION VALUES AND RELATED METHOD

BACKGROUND OF THE INVENTION

1. Field of the Invention

The present invention relates to rotating magnetic disk drives, and more particularly, to a disk drive having a servo control system optimized for faster determination of repeatable runout correction values.

2. Description of the Prior Art and Related Information

In order to remain competitive, disk drive manufacturers must continually provide increased data storage capacity while rigidly controlling disk drive manufacturing cost. One key to increased storage capacity is increased track density, often expressed as tracks per inch or TPI. A limiting factor on the track density is repeatable runout (RRO) which results from imperfections, with respect to a perfect circle, in the location of servo information along a track on a disk surface in the disk drive. The RRO imperfections are relatively static over time and the effect of the RRO may be attenuated by measuring the RRO during manufacturing and using the RRO measurements in a head-position servo loop to compensate for the RRO.

Accordingly, there exists a need for a technique for more efficiently determining RRO cancellation values.

SUMMARY OF THE INVENTION

The present invention may be embodied in a disk drive having a head disk assembly (HDA) and a servo control system optimized for faster determination of repeatable runout (RRO) correction values. The HDA includes a rotating magnetic disk and an actuator. The magnetic disk has distributed position information in a plurality of uniformly spaced-apart servo wedges for defining a plurality of circumferential tracks. Each circumferential track exhibits total runout having a repeatable runout component and a nonrepeatable runout component. The actuator positions a transducer head in response to a control signal. The transducer head is for periodically reading the distributed position information from the servo wedges and for accessing data on the tracks. The control system generates the control signal for positioning the transducer head during a track following operation based on the distributed position information. The control system includes a position error signal (PES) calculator circuit, a first servo-loop compensator, and a second servo-loop compensator. The PES calculator circuit calculates PES values based on the distributed servo position information read during a track following operation. The first servo-loop compensator processes the PES values during a normal data access operation. The first servo-loop compensator has a first transfer function that is optimized with respect to a variance of the total runout resulting in a first ratio of a variance of the repeatable runout component and a variance of the nonrepeatable runout component. The second servo-loop compensator processes the PES values during a RRO calibration operation. The second servo-loop compensator has a second transfer function that is optimized with respect to a variance of the nonrepeatable runout component resulting in a second ratio of a variance of the repeatable runout component and the variance of the nonrepeatable runout component. The second ratio is greater than the first ratio.

The present invention also may be embodied in a method for reducing the number of disk rotations required for determining repeatable runout correction values in a disk drive. In the method, track following is performed along a track using a servo-loop compensator that is optimized with respect to a variance of a nonrepeatable runout component of the followed track and that is not optimized with respect to a variance of a repeatable runout component of the followed track. During the track following, the repeatable runout correction values are determined for the followed track.

BRIEF DESCRIPTION OF THE DRAWINGS

The accompanying drawings illustrate embodiments of the present invention and, together with the description, serve to explain the principles of the invention.

DETAILED DESCRIPTION

Figure 1:
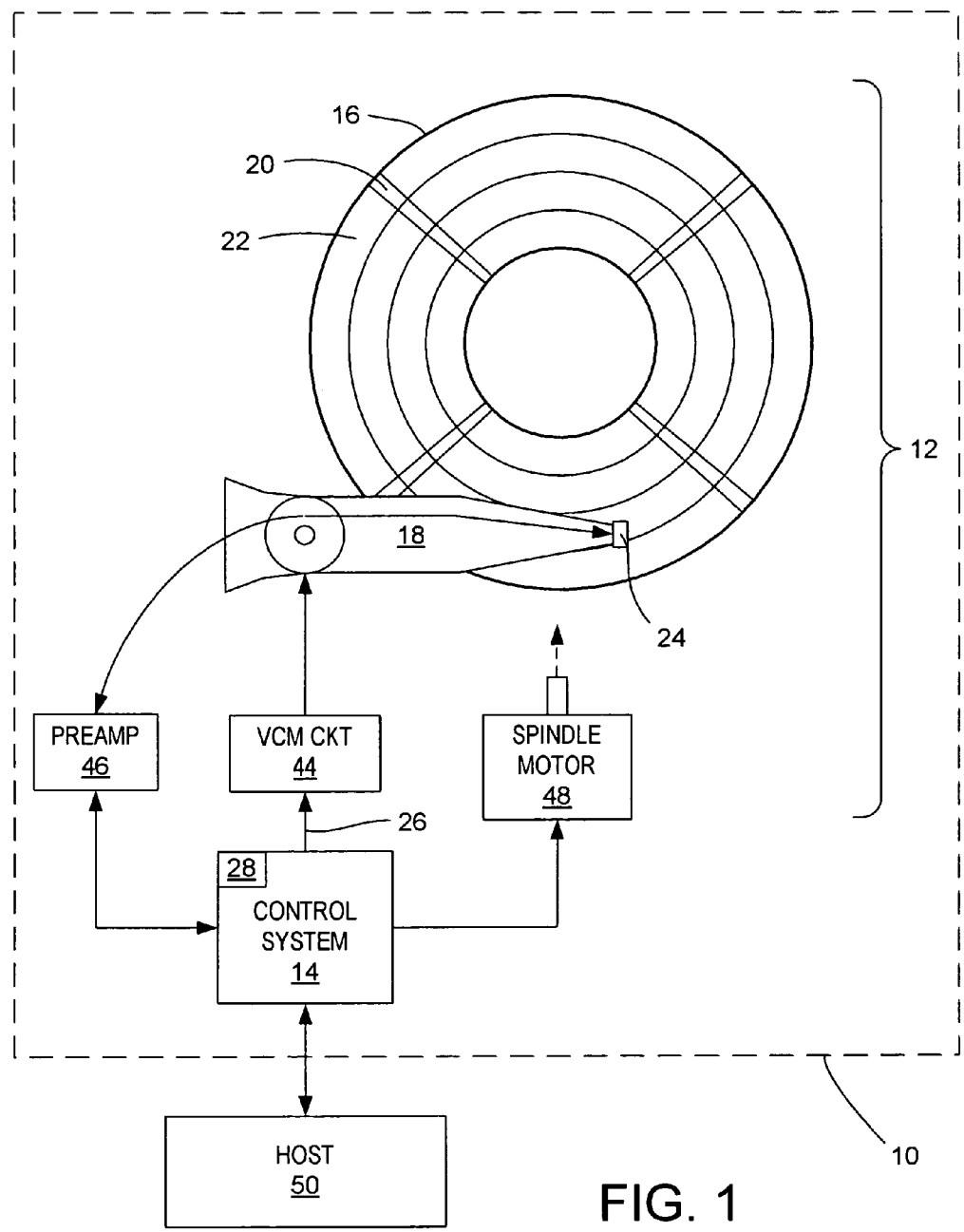
FIG. 1 is a block diagram of a disk drive having a servo control system optimized for faster determination of repeatable runout (RRO) correction values, according to the present invention.
Figure 2:
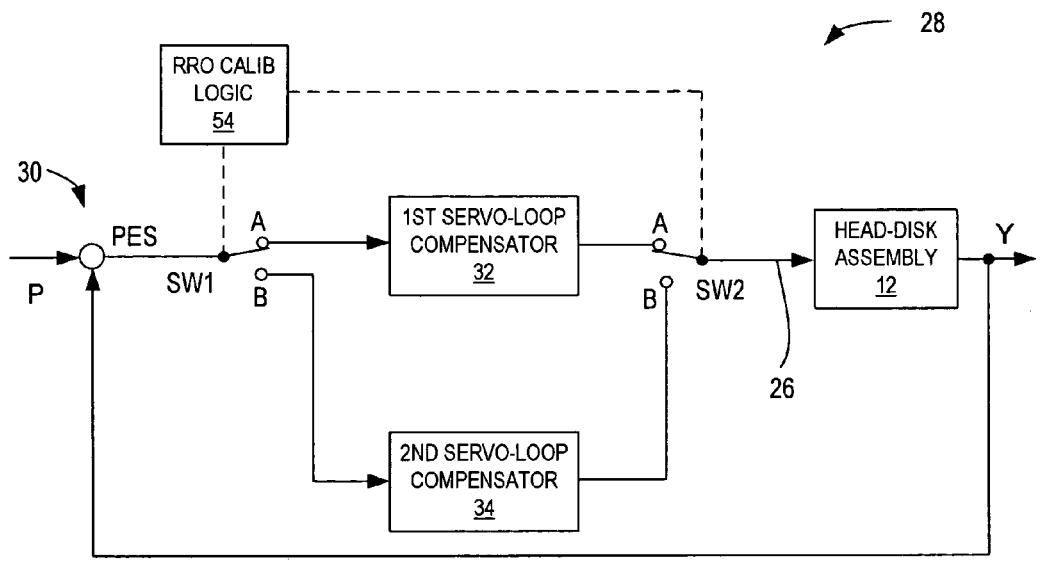
FIG. 2 is a block diagram of a servo control loop, implemented by the disk drive of FIG. 1, having first and second servo-loop compensators.
Figure 3:
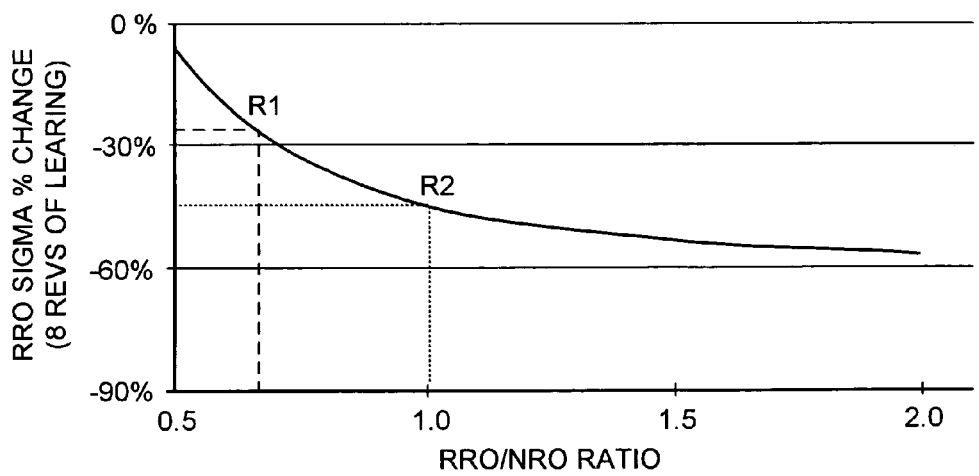
FIG. 3 is a graph showing percentage of RRO change after eight revolutions of RRO learning versus a ratio of RRO variance to NRO variance.

With reference to FIGS. 1 to 3, the present invention may be embodied in a disk drive 10 (FIG. 1) having a head disk assembly (HDA) 12, and a servo control system 14 optimized for faster determination of repeatable runout (RRO) correction values. The HDA includes a rotating magnetic disk 16 and an actuator 18. The magnetic disk has distributed position information in a plurality of uniformly spaced-apart servo wedges 20 for defining a plurality of circumferential tracks 22. Each circumferential track exhibits total runout (TRO) having an RRO component and a nonrepeatable runout (NRO) component. The actuator positions a transducer head 24 in response to a control effort signal 26. The transducer head is for periodically reading the distributed position information from the servo wedges and for accessing data on the tracks. The control system generates the control signal for positioning the transducer head during a track following operation based on the distributed position information. The control system includes a servo control loop 28 (FIG. 2) having a position error signal (PES) calculator circuit 30, a first servo-loop compensator 32, and a second servo-loop compensator 34. The PES calculator circuit 30 calculates PES values based on the distributed servo position information read during a track following operation. The first servo-loop compensator 32 processes the PES values during a normal data access operation. The first servo-loop compensator has a first transfer function that is optimized with respect to a variance of the TRO resulting in a first ratio R1 (FIG. 3) of a variance of the RRO component and a variance of the NRO component. The second servo-loop compensator processes the PES values during a RRO calibration operation. The second servo-loop compensator has a second transfer function that is optimized with respect to a variance of the NRO component resulting in a second ratio R2 of a variance of the RRO component and the variance of the NRO component. The second ratio is greater than the first ratio.

Figure 4:
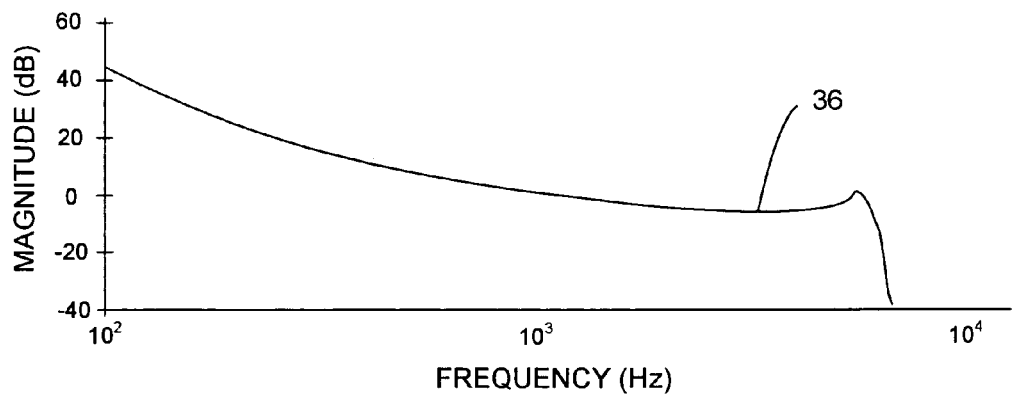
FIG. 4 shows a graph of an open loop response of the first servo-loop compensator.
Figure 5:
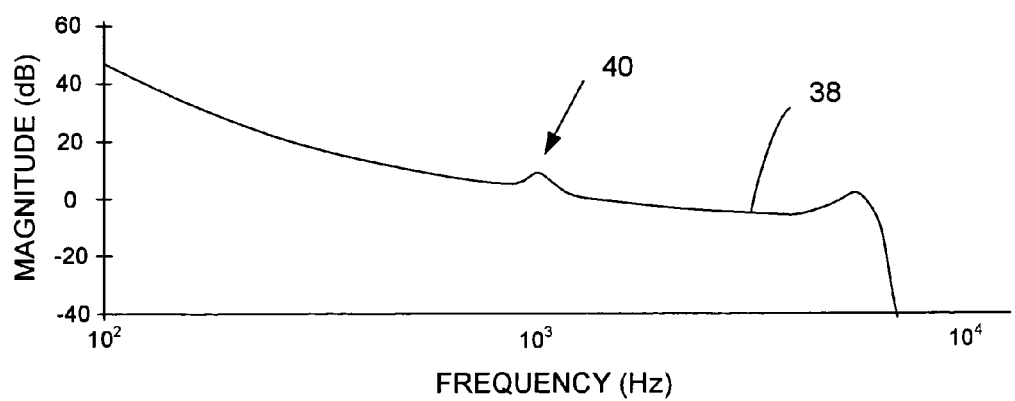
FIG. 5 shows a graph of an open loop response of the second servo-loop compensator.

The first servo-loop compensator 32 is designed to minimize the overall PES during a track following operation. A representative open-loop transfer function 36 for the first servo-loop compensator is shown in FIG. 4. The second servo-loop compensator 34 is designed to take advantage of more aggressive reduction of the NRO because the RRO calibration may be performed in a controlled manufacturing environment. In the second servo-loop compensator, less weight is place on the RRO variance, operation vibration performance, and resonances sensitive to temperature, and more weight is placed on low-frequency disk modes, low-frequency HDA windage, and certain other NRO peaks. A representative open-loop transfer function 38 for the second servo-loop compensator is shown in FIG. 5. A readily discernable difference in the transfer functions is a peak 40 at about 1,000 Hertz (Hz) in the transfer function 38 of the second servo-loop compensator 34. The peak corresponds to NRO modes and selectively reduces the effect of the NRO during the track following operations for RRO calibration. Thus, the RRO may be more effectively determined.

More specifically, with reference again to FIG. 3, the first servo-loop compensator 32 may have a ratio R1 of the RRO variance to NRO variance of about 0.6 to 0.9. With a ratio of 0.67, the percentage reduction in the RRO sigma value may be about 26% after 8 disk revolutions of RRO learning. The second servo-loop compensator may have a ratio R2 of the RRO variance to NRO variance of about 1.0 to 1.3. With a ratio of 1.0, the percentage reduction in the RRO sigma value may be about 44% after 8 disk revolutions of RRO learning. Thus, the desired level of learning for the RRO correction values may be obtained with fewer disk revolutions.

With reference again to FIG. 1, the transducer head 24 in present disk drives 10 comprises a giant magneto-resistive (GMR) read element and thin film inductive write element. The actuator 18 is typically implemented as a voice coil motor (VCM) circuit 44 which rotates an actuator arm about a pivot in order to position the head radially over the disk in response to the control signals 26 from the disk control system 14. The HDA 12 also includes a preamplifier 46, and a spindle motor 28 for rotating the disk 16. The head communicates with the control system 14 via the preamplifier.

The control system 14 also includes circuitry and processors that provide an intelligent disk control system interface between a host 50 and the HDA 12 for execution of read and write commands. The control system may have, for example, an internal microprocessor and nonvolatile memory. Program code for implementing the techniques and control functions of the invention may be stored in the nonvolatile memory and transferred to volatile random access memory (RAM) for execution by the microprocessor.

The control system 14 implements the servo control loop 28 which causes the head 24 to follow a desired circular path (or centerline) of the selected track 22 in a track following operation. During track following, the path of the head wanders about the desired circular track path. Typically, the control system attempts to limit the head wander to within a predetermined range defined by a "Track Misregistration" (TMR) budget.

The servo control loop 28 may be implemented using a digital microprocessor and, accordingly, the signals described herein may represent digital samples. A track 22 is selected for track following by applying a reference head position value P corresponding to the selected track at the input of the servo control loop. The position error signal PES is generated based on the difference between the reference head position value P and the actual head position signal Y. The actual head position signal Y is measured as the head 24 passes over a servo sector 20 of the selected track. Nominally, the first servo-loop compensator 32 processes the PES and generates the control signal 26 for application to the HDA 12. However, during an RRO calibration operation, track following in performed using the second servo-loop compensator 34, according to the present invention. Switching between the first and second servo-loop compensators is represented by first and second switches, SW1 and SW2, actuated by RRO calibration logic 54. However, the switch between the first and second servo-loop compensators may be performed by program code that changes parameters of a digitally implemented servo-loop compensator, or that otherwise adds functions to or modifies the transfer function of the digitally implemented servo-loop compensator.

Figure 6:
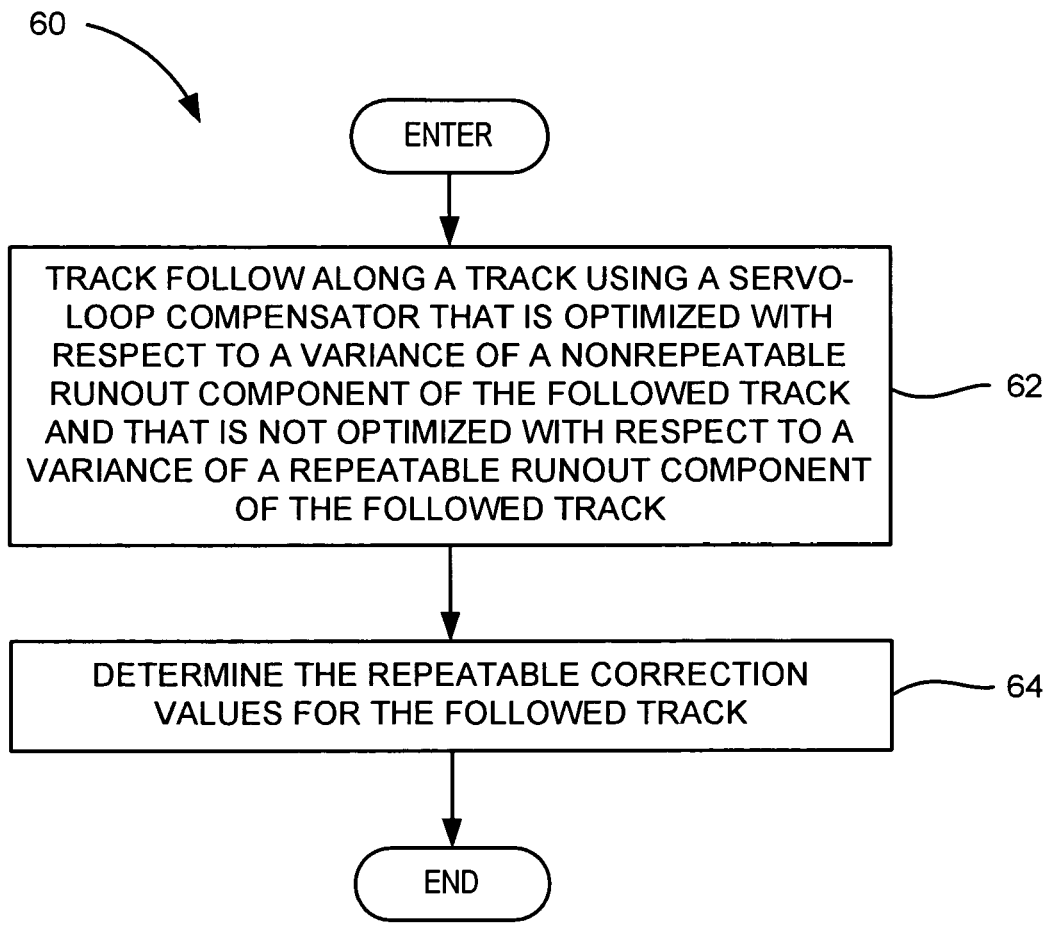
FIG. 6 is a flow diagram illustrating a method for reducing the number of disk rotations required for determining RRO correction values in a disk drive, according to the present invention.

With reference to FIG. 6, the present invention also may be embodied in a method 60 for reducing the number of disk rotations required for determining RRO correction values in a disk drive 10. In the method, track following is performed along a track 22 using a servo-loop compensator 34 that is optimized with respect to a variance of a NRO component of the followed track and that is not optimized with respect to a variance of a RRO component of the followed track (step 62). During the track following, the RRO correction values are determined for the followed track (step 64).

Further information on exemplary techniques for determining the RRO correction values is disclosed in U.S. patent application Ser. No. 10/125,007, titled METHOD FOR DETERMINING REPEATABLE RUNOUT CANCELLATION VALUES IN A MAGNETIC DISK DRIVE USING FILTERING, which application is incorporated herein by reference.

What is claimed is:

1. A control system for processing distributed servo position information defining a plurality of circumferential tracks on a disk of a disk drive, and for generating a control signal for positioning a transducer head during a track following operation, each circumferential track exhibiting total runout having a repeatable runout component and a nonrepeatable runout component, the control system comprising:

a position error signal (PES) calculator circuit for calculating PES values based on the distributed servo position information read during a track following operation;

a first servo-loop compensator for processing the PES values during a normal data access operation, the first servo-loop compensator having a first transfer function that is optimized with respect to a variance of the total runout component resulting in a first ratio of a variance of the repeatable runout component and a variance of the nonrepeatable runout component; and a second servo-loop compensator for processing the PES values during a repeatable runout calibration operation, the second servo-loop compensator having a second transfer function that is optimized with respect to a variance of the nonrepeatable runout component resulting in a second ratio of a variance of the repeatable runout component and the variance of the nonrepeatable runout component, wherein the second ratio is greater than the first ratio.

2. A control system as defined in claim 1, wherein the distributed position information comprises a plurality of spaced-apart embedded servo wedges.

3. A disk drive, comprising:
a head disk assembly (HDA) including
- a rotating magnetic disk having distributed position information in a plurality of uniformly spaced-apart servo wedges for defining a plurality of circumferential tracks, each circumferential track exhibiting total runout having a repeatable runout component and a nonrepeatable runout component;
- an actuator for positioning a transducer head in response to a control signal, the transducer head for periodically reading the distributed position information from the servo wedges and for accessing data on the tracks; and
- a control system for generating the control signal for positioning a transducer head during a track following operation based on the distributed position information, the control system comprising:
  - a position error signal (PES) calculator circuit for calculating PES values based on the distributed servo position information read during a track following operation;
  - a first servo-loop compensator for processing the PES values during a normal data access operation, the first servo-loop compensator having a first transfer function that is optimized with respect to a variance of the total runout resulting in a first ratio of a variance of the repeatable runout component and a variance of the nonrepeatable runout component;
  - a second servo-loop compensator for processing the PES values during a repeatable runout calibration operation, the second servo-loop compensator having a second transfer function that is optimized with respect to a variance of the nonrepeatable runout component resulting in a second ratio of a variance of the repeatable runout component and the variance of the nonrepeatable runout component, wherein the second ratio is greater than the first ratio.

* * * * *